United States Patent [19]

Yamamoto et al.

[11] Patent Number: 5,323,242
[45] Date of Patent: Jun. 21, 1994

[54] CARRIER SIGNAL GENERATING CIRCUIT IN VIDEO SIGNAL RECORDING/REPRODUCING APPARATUS

[75] Inventors: Norihisa Yamamoto, Gunma; Hirokazu Kitamura, Takasaki; Katsuyoshi Yamashige, Takasaki; Takashi Kurihara, Takasaki; Tadashi Matsushima, Takasaki, all of Japan

[73] Assignees: Hitachi, Ltd.; Hitachi Microcomputer Engineering, Ltd., both of Tokyo, Japan

[21] Appl. No.: 464,031

[22] Filed: Jan. 12, 1990

[30] Foreign Application Priority Data

Jan. 17, 1989 [JP] Japan .................................. 1-006021
Jan. 17, 1989 [JP] Japan .................................. 1-006022
Jan. 17, 1989 [JP] Japan .................................. 1-006023

[51] Int. Cl.$^5$ ............................................. H04M 9/80
[52] U.S. Cl. ................................ 358/324; 358/315; 358/320; 358/330
[58] Field of Search ............... 358/320, 324, 330, 337, 358/12, 16, 21 R, 41, 141, 150, 160, 315–319

[56] References Cited

U.S. PATENT DOCUMENTS 4,985,781 1/1991 Hirasawa .......................... 358/324

FOREIGN PATENT DOCUMENTS 57-123785 8/1982 Japan .
63-160494 7/1988 Japan .
63-226192 9/1988 Japan .
64-48592 2/1989 Japan .
1120193 5/1989 Japan .

OTHER PUBLICATIONS

"Nikkei Electronics", Sep. 5, 1988, No. 455, pp. 179–183, and English translation.
The Institute of Television Engineers of Japan (ITEJ) Technical Report vol. 12, No. 17, pp. 1–6, TEBS' 88-8 May, 1988.
VHS YC I chip "HA118105" by Hitachi, Technical Manual.

Primary Examiner—W. R. Young
Attorney, Agent, or Firm—Fay, Sharpe, Beall, Fagan, Minnich & McKee

[57] ABSTRACT

In a video signal apparatus, a carrier signal generating circuit includes a VCO for generating a signal having a frequency at least twice that of a carrier signal necessary for conversion to a lower band with a sub-carrier in an NTSC system, a one-half divider circuit for dividing the VCO frequency signal by two, a delayed flip-flop circuit for receiving the divided signal and the sub-carrier signal to generate a difference frequency signal, a 1/40 divider circuit for dividing the Q output, a phase comparator circuit for comparing the phases of the 1/40 divided signal and the horizontal synchronizing signal to output a phase difference, a frequency discriminator circuit for comparing the phase of the flip-flop output with the frequency-divided output of the horizontal synchronizing signal to output a frequency error, and a circuit for converting the output of the phase comparator circuit and the frequency error into DC voltages and applying their sum as a control voltage for the VCO. A CR constant control circuit controls the CR constant of a four-phase signal generator for converting the output of the one-half divider circuit into a four-phase signal.

29 Claims, 12 Drawing Sheets

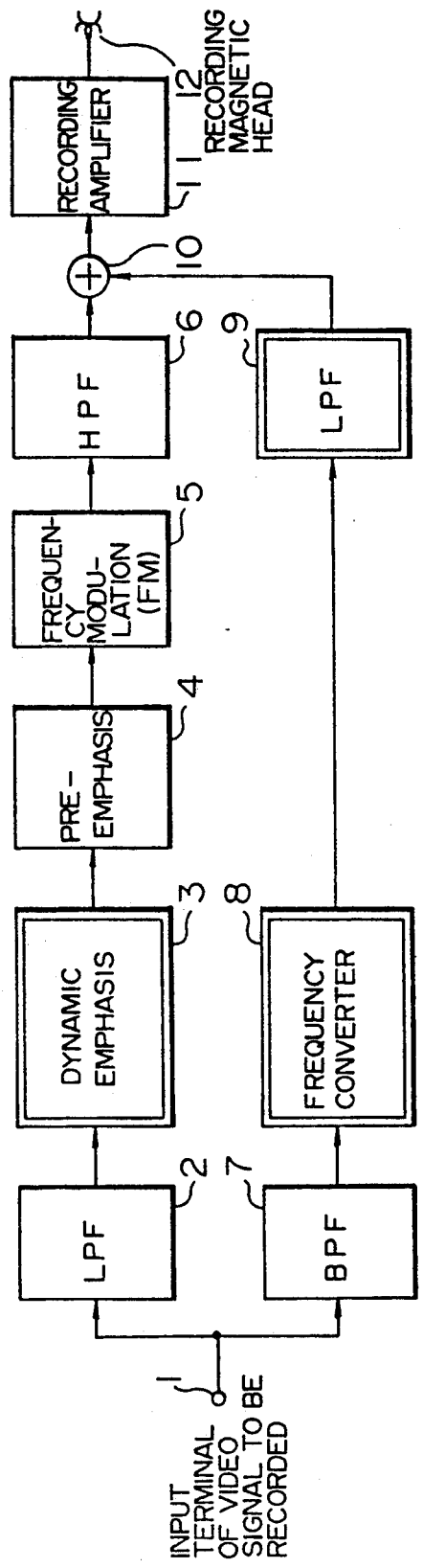
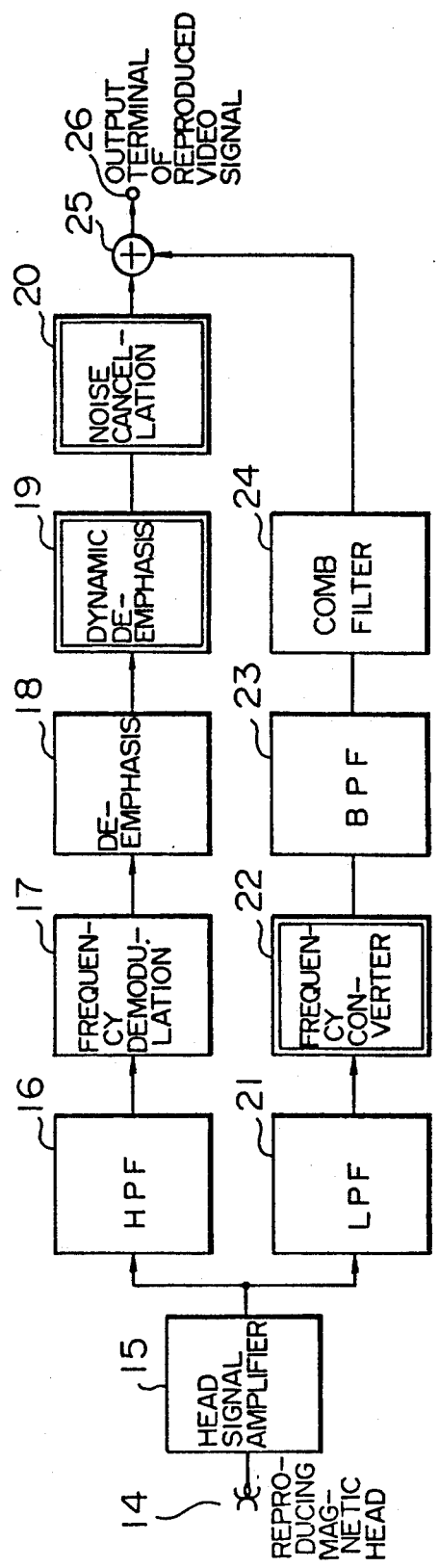

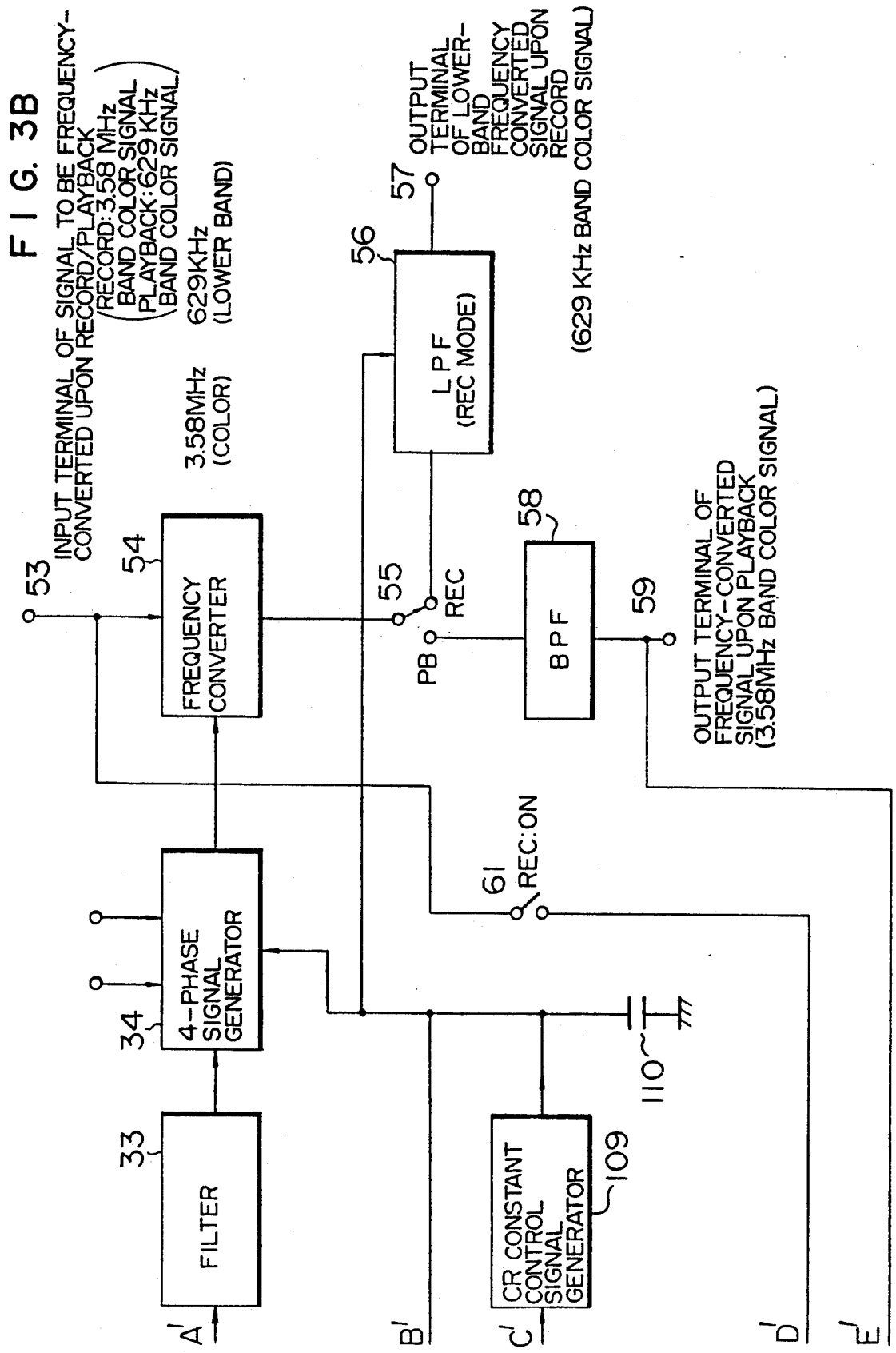

F I G. 11
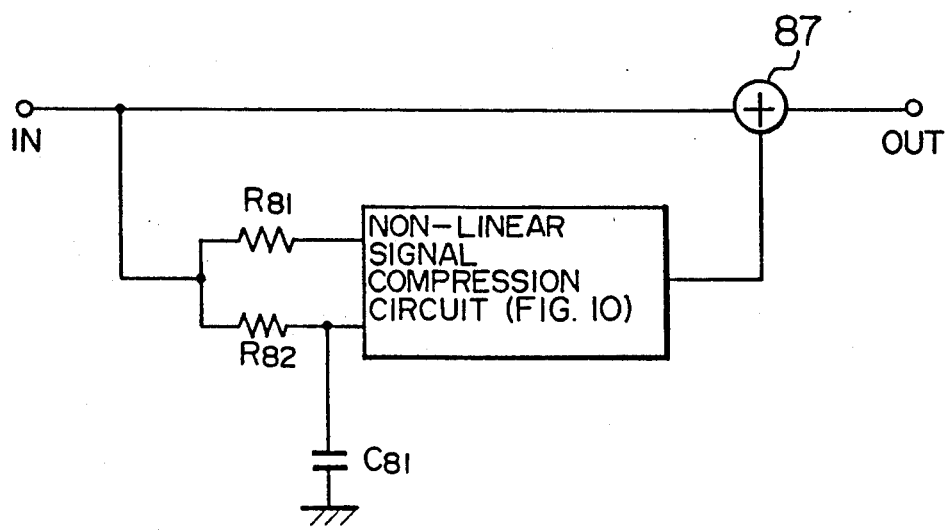
F I G. 12
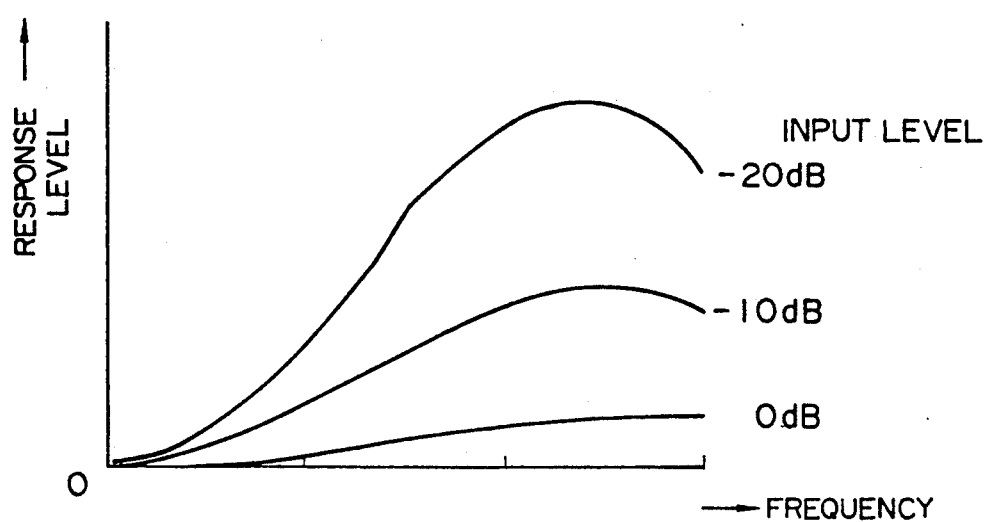

CARRIER SIGNAL GENERATING CIRCUIT IN VIDEO SIGNAL RECORDING/REPRODUCING APPARATUS

BACKGROUND OF THE INVENTION

The present invention relates to a video signal recording/reproducing apparatus such as a color video tape recorder (VTR). More particularly, the present invention relates to a generator device for a carrier signal necessary for frequency conversion of a color signal of a VTR, a luminance signal processing device and a color signal processing device which are included in the VTR (hereinafter, such devices will be sometimes referred to as video signal processing apparatus or devices generically.) The present invention further relates to a semiconductor integrated circuit (IC) apparatus which is suitable for provision of such a device or devices in an IC configuration.

With the formulation of electronic circuit systems of VTRs inclusive of household VTRs into IC configuration, circuit systems having better cost performance have been extensively developed and endeavors to improve the quality of an image on a display screen have been made.

A color signal processing device (or unit) plays an important part, especially, for improvement of the image quality. The color signal processing device includes therein a carrier signal generating circuit for generating a carrier signal necessary for frequency conversion of a color signal.

In a household VTR, a color signal is band-converted to a lower frequency band of a luminance signal subjected to frequency modulation (FM) or frequency conversion and is thereafter recorded or reproduced. In a VTR system in which the carrier frequency of the lower-band converted color signal is $40f_H$ ($f_H$: the frequency of a horizontal synchronizing signal), the frequency $f_C$ of a carrier signal necessary for band conversion is $f_{SC}+40f_H$ ($f_{SC}$: color subcarrier frequency of video signal).

One of the conventional systems in which such a carrier frequency signal $f_C$ of $f_{SC}+40f_H$ is generated has been disclosed by JP-A-57-123785. In the disclosed system, $n \times 40f_H$ is divided by n to generate a 4-phase signal including four $40f_h$ signals the phases of which having a phase difference of 90° therebetween are passed through low-pass filters (LPF's) to two frequency converters in combination with two signals generated from a crystal oscillator of $f_{SC}$ and having a phase difference of 90° therebetween, so that outputs of the two frequency converters are synthesized to generate $f_{SC}+40f_H$.

In another system as has been disclosed by The Institute of Television Engineers of Japan (ITEJ) Technical Report Vol. 12, No. 17, pp. 1-6, TEBS'88-8, May 1988 reported by the present inventors, a signal from a voltage controlled oscillator (VCO) is frequency-divided divided to generate a one-phase or single-phase $40f_H$ component. After the single-phase $40f_H$ component has been passed through an LPF and frequency-converted with an $f_{SC}$ signal, only an $f_{SC}+40f_H$ component is extracted to generate a 4-phase signal which includes four signals having a frequency of $f_{SC}+40f_H$ and a phase difference of 90°.

Each of the above-mentioned systems includes a frequency conversion circuit for multiplying an $f_{SC}$ signal and a $40f_H$ signal by each other and a low-pass filter (LPF) for reducing harmonics of the $40f_H$ signal of a rectangular waveform. Outputs of a $40f_H$ signal generating circuit and a frequency converter contain unnecessary signal components including frequencies of $l \times 40f_H$ and $mf_{SC} \pm n \times 40f_H$, wherein l is an integer equal to or greater than 2, m an integer equal to or greater than 1, and n an integer equal to or greater than 2. A band-pass filter (BPF) and so on are provided on the output side of the frequency converter in order to eliminate those unnecessary signal components. However, complete elimination of the undesired signal components is impossible. Also, there is a fear that the unnecessary signal components may have crosstalk with another circuit block on an integrated circuit device through power source lines, grounded lines and so on, thereby deteriorating the signal-to-noise (S/N) ratio.

Means for solving some of the above-mentioned problems is disclosed by U.S. Pat. No. 4,860,120 issued on Aug. 22, 1989. However, the disclosed system needs a linear converter for a PLL (phase-locked loop) circuit and hence the number of circuit components required is large. As a result, the disclosed system is not advantageous in providing the system in an IC configuration. Further, the solution to the problem of crosstalk is not sufficient.

In a luminance signal processing device in a video signal processing apparatus, each of a dynamic emphasis circuit for a recording system and a dynamic de-emphasis circuit and a noise cancellation circuit for a reproducing system includes an amplitude limiting circuit. In one example of the luminance signal processing, a noise suppression circuit as shown in FIG. 7 is provided for suppressing noises in a luminance signal reproduced. Referring to FIG. 7, a video signal supplied to an input terminal 71 is applied through a high-pass filter (HPF) 72, a limiter circuit 73, an attenuator 74 and a low-pass filter, (LPF) 75 to a subtracter 76 in which the output of the LPF 75 is substracted from the input signal applied directly from the input terminal 71. The output of the subtracter 76 is delivered to an output terminal 77.

A typical conventional example of the limiter circuit 73 employs a differentially operating type of limiter circuit which includes diodes as shown in FIG. 8. Referring to FIG. 8, limiter circuit includes input terminals 78 and 79, differentially operative transistors $Q_{71}$ and $Q_{72}$, load resistors $R_{71}$ and $R_{72}$, diodes $D_{71}$ and $D_{72}$, and output terminals 80 and 81.

The characteristic of the limiter circuit shown in FIG. 8 will now be explained with reference to FIGS. 9A and 9B. For a sinusoidal input signal 83, as shown in FIG. 9A, having an amplitude at which the transistors $Q_{71}$ and $Q_{72}$ are switched, the output of the limiter circuit of FIG. 8 takes a distorted waveform as shown by solid line 84 in FIG. 9B. On the other hand, in the case where the diodes $D_{71}$ and $D_{72}$ are not provided, the amplitude is limited to provide a planar form as shown by broken line 85 in FIG. 9B. Namely, in the construction shown in FIG. 8 in which the diodes $D_{71}$ and $D_{72}$ are provided, a waveform distortion having a characteristic frequency component is generated upon transient response and a zero-crossing point is delayed. Therefore, the response waveform is different depending upon an input frequency. Also, the response waveform includes points of discontinuous folding or inflection, as seen from the waveform 85 shown in FIG. 9B.

Accordingly, when a limiter circuit is used for the processing of a luminance signal, a waveform distortion is generated, thereby deteriorating the quality of an image.

When a signal processing circuit, for example, a CR constant circuit used in a color signal processing circuit of a recording system is to be formed in the form of a semiconductor integrated circuit, it should be considered that the characteristics of circuit elements formed in the semiconductor integrated circuit may have manufactural fluctuations or deviations which are relatively large. Therefore, there is employed a method in which a resistor and a capacitor constituting an oscillator circuit, a filter circuit or the like are provided by external parts so that adjustment or compensation for the manufactural fluctuations is made to obtain a desired oscillation frequency or a desired frequency response. In this case, the cost for adjustment and the cost of circuit components or parts become large.

Therefore, attempts to make the adjustment of such circuits unnecessary have been made. For example, the semiconductor integrated circuit device HA11856 for color signal processing sold by Hitachi Ltd. uses a PLL (phase-locked loop) system. In this system, a fixed reference frequency which is formed by a crystal oscillator and an oscillating signal to be controlled which is formed by a voltage controlled oscillator circuit, are supplied to a phase detection circuit to generate a control signal corresponding to a phase difference between the two supplied signals, and the control signal is supplied to a variable junction capacitance element (or vari-cap) which forms the voltage controlled oscillator circuit. Thereby, the reference frequency and the oscillation frequency are made accurately coincident with each other.

The control signal is also supplied to a vari-cap which forms an active filter or another oscillator circuit and which is provided with the same structure, and laid out in proximity to, the vari-cap of the above-mentioned voltage controlled oscillator circuit so as to have good pairing therewith. As a result, the manufactural fluctuation or unevenness of the CR constant of a CR constant circuit formed by a semiconductor integrated circuit is absorbed or controlled.

JP-A-64-48592 by the present inventors laid open on Feb. 23, 1989 shows a CR constant control circuit by it is acknowledged as being prior art.

The above-mentioned PLL system requires the voltage-controlled oscillator circuit, the phase detection circuit and a loop filter which form a PLL circuit. Namely, the number of circuit elements required is large and a circuit construction becomes complicated. Further, the complicated circuit construction makes it difficult to provide pairing of circuit elements with sufficient precision.

SUMMARY OF THE INVENTION

An object of the present invention is to provide a video signal recording/reproducing apparatus inclusive of a carrier signal generating circuit, in which linear converters and the associated filters are not required and so the number of circuit components is reduced, the circuit construction is simplified and a highly stable carrier signal can be obtained, and which is suitable for provision thereof in an IC configuration.

Another object of the present invention is to provide a carrier signal generating circuit in an IC form which is suitable for frequency conversion of a color signal for a VTR.

A further object of the present invention is to provide a video signal recording/reproducing apparatus having a function of suppressing noise in a luminance signal, and which is capable of performing signal processing without increasing waveform distortion of the luminance signal.

A still further object of the present invention is to provide a video signal recording/reproducing apparatus including a CR constant control circuit, in which the setting of the CR constant with high precision is possible with a relatively simple construction.

According to one feature of the present invention, a carrier signal generating circuit in a video signal recording/reproducing apparatus for recording or reproducing a color signal after frequency conversion thereof to a lower-band signal, the phase of which is shifted in synchronism with a horizontal synchronizing signal, comprises a first oscillator oscillating at a frequency which is K/L times as high as the sum $$f_C = f_{SC} + \frac{M}{N} f_H$$

of a carrier frequency $f_{SC}$ of the color signal and a frequency M/N times as high as the frequency $f_H$ of the horizontal synchronizing signal, each of M, N, K and L being an integer, a divider circuit for frequency-dividing an output of the first oscillator by L/K to generate a carrier signal, and a phase-shifted signal generating circuit for generating from an output of the divider circuit a signal having a phase which is shifted in synchronism with the horizontal synchronizing signal. The carrier signal generating circuit further comprises a delayed flip-flop (D-FF) for receiving the output $f_C$ of the divider circuit as a clock input thereof and the subcarrier frequency $f_{SC}$ as a data input thereof to output a frequency signal representative of a difference between the two inputs, a second dividing circuit for frequency-dividing an output of the D-FF by a predetermined number to obtain a frequency $f_H'$ corresponding to the horizontal synchronization frequency, a phase comparator for comparing the phase of the output frequency $f_H'$ of the second divider circuit and the phase of the reference synchronization frequency $f_H$ with each other to output a difference therebetween, and a filter for passing therethrough the output of the phase comparator for feedback to the first oscillator which is a voltage controlled oscillator (VCO), whereby a phase-locked loop is formed in combination with the voltage controlled oscillator which forms the first oscillator. A frequency discriminator is provided for comparing the output of the D-FF with a frequency obtained by dividing the reference synchronization frequency $f_H$ by a predetermined number to output a difference in frequency therebetween which in turn is supplied to the first oscillator so as to compensate for an error to the input of the first oscillator.

The subcarrier frequency $f_{SC}$ of a television of an NTSC system is $$\frac{455}{2} f_H$$

($f_H$=15734.265 Hz) and the carrier signal frequency $f_C$ required for a VTR of a system which includes conversion to the frequency of $40f_H$ is $f_C = f_{SC} + 40f_H \frac{535}{2} f_H$.

It is possible to generate $f_C$ by providing an oscillator oscillating at a frequency N times as high as $f_C$ and a 1/N divider circuit.

With the above construction, $f_C$ can be generated without producing harmonics of $40f_H$ and without requiring any frequency converter.

In the conventional system, $f_{SC}+40f_H$ is extracted from the signal components of $$f_{SC} \pm \frac{320}{8} f_H.$$

On the other hand, in the present invention, since $(f_{SC}+40f_H)\times 2$ is generated and this signal is thereafter divided by 2, unnecessary signal components are not produced. Accordingly, the obtained signal can be subjected to frequency conversion as a carrier signal in a state in which no unnecessary signal component is involved. Further, since no unnecessary signal component is generated, there occurs no crosstalk with another circuit block (for example, a frequency modulation (FM) circuit block in a luminance signal processing circuit) formed on a semiconductor substrate, thereby making it possible to improve the S/N ratio. Also, the provision of the D-FF circuit makes it possible to remove a linear converter from a PLL circuit which is included in the carrier signal generating circuit.

According to another feature of the present invention, a non-linear signal compression circuit comprises a first differential amplifier composed of transistors having their bases for receiving differential signal inputs and their collectors for producing differential outputs, two resistors connected as collector loads to the transistors of the first differential amplifier, second and third differential amplifiers each of which is composed of transistors complimentary to the transistors of the first differential amplifier, first and second level shifter circuits connected between the base of one of the transistors of the second differential amplifier and the collector of one of the transistors of the first differential amplifier and between the base of one of the transistors of the third differential amplifier and the collector of the other of the transistors of the first differential amplifier, respectively, and feedback resistors for making negative feedback of the collector outputs of the transistors of the second and third differential amplifiers to the base inputs of the first differential amplifiers, whereby there is provided a limiter circuit for luminance signal processing which produces an output waveform having no point of discontinuous folding or inflection and no frequency dependency with regard to amplitude limitation.

Basically, the non-linear signal compression circuit has a construction in which differential output signals of a differential transistor amplifier receiving input signals are cross-coupled from the collectors on the output side of the differential transistor amplifier to the bases on the input side of the differential transistor amplifier through negative feedback circuits, the amounts of feedback of which are changed depending upon the input signals.

In the case where the transistors of the first differential amplifier are of NPN type, the transistors of the second and third differential amplifiers are of PNP type. The bases of the transistors of the second and third differential amplifiers are connected between the collectors of the transistors of the first differential amplifier through voltage circuits for level shift.

When the transistors of the first differential amplifier are in the vicinity of a balanced condition, the transistors of the second and third differential amplifiers supply differential outputs resulting in no negative feedback to the first differential amplifier, by virtue of the above-mentioned voltage circuits for level shift. When an output level of the collector of the transistor of the first differential amplifier which is an output of the limiter circuit is in the vicinity of a voltage level to be subjected to amplitude limitation, the transistors of the second and third differential amplifiers perform negative feedback operations to the transistors of the first differential amplifier, thereby effecting an amplitude limiting operation.

In the case where one of the two inputs of the first differential amplifier is changed to a positive (+) side or developed in a positive direction, the transistors of the second differential amplifier operate. On the other hand, in the case where the input is changed to a negative (−) side or developed in a negative direction, the transistors of the third differential amplifier operate. In order that such negative feedback operations are made symmetrically on the positive (+) and negative (−) sides, differential voltages to be provided to the paired transistors of the second and third differential amplifiers ar supplied with the same voltage.

According to a further feature of the present invention, a CR constant control circuit used in a video signal processing apparatus comprises a CR constant circuit for receiving a reference frequency signal to produce a first signal having a phase which is different from that of the first reference frequency signal by 45° and a level which is $2^{\frac{1}{2}}$ times of that the first reference frequency signal, the CR constant circuit including a resistor and a variable capacitance element, a phase synthesis circuit for receiving the reference frequency signal and the first signal to produce a second signal corresponding to the level of the first signal or a voltage developed by the resistor and the variable capacitance element of the CR constant circuit, and a phase detection circuit for phase-detecting the reference frequency signal and the second signal to generate a control signal which brings a difference in phase between both the detected signals to 90°, the variable capacitance element being controlled by the generated control signal.

Since the CR constant circuit to be controlled is provided with relatively simple circuits including the reference frequency oscillator circuit, the phase synthesis circuit and the phase detection circuit, it becomes possible to control the CR constant of the CR constant circuit so that it has a desired value.

BRIEF DESCRIPTION OF THE DRAWINGS

FIGS. 1A and 1B are circuit block diagrams respectively showing a recording system and a reproducing system of a video signal recording/reproducing apparatus to which the present invention is applied;

FIGS. 3A and 3B show a circuit block diagram of a frequency conversion system for recording/reproducing according to an embodiment of the present invention;

Figure 4:
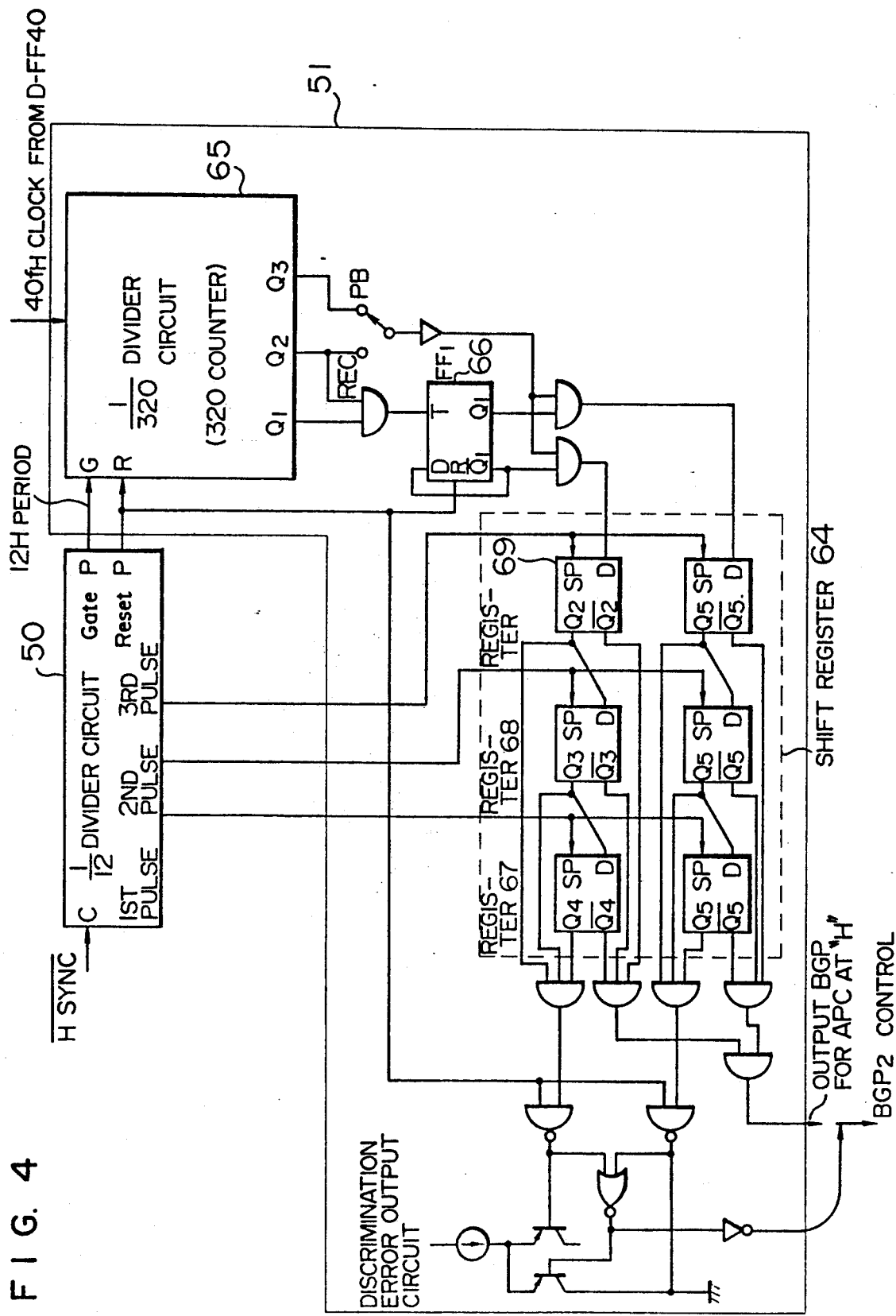
FIG. 4 is a circuit diagram showing an embodiment of a frequency detection circuit shown in FIGS. 3A and 3B.
Figure 5:
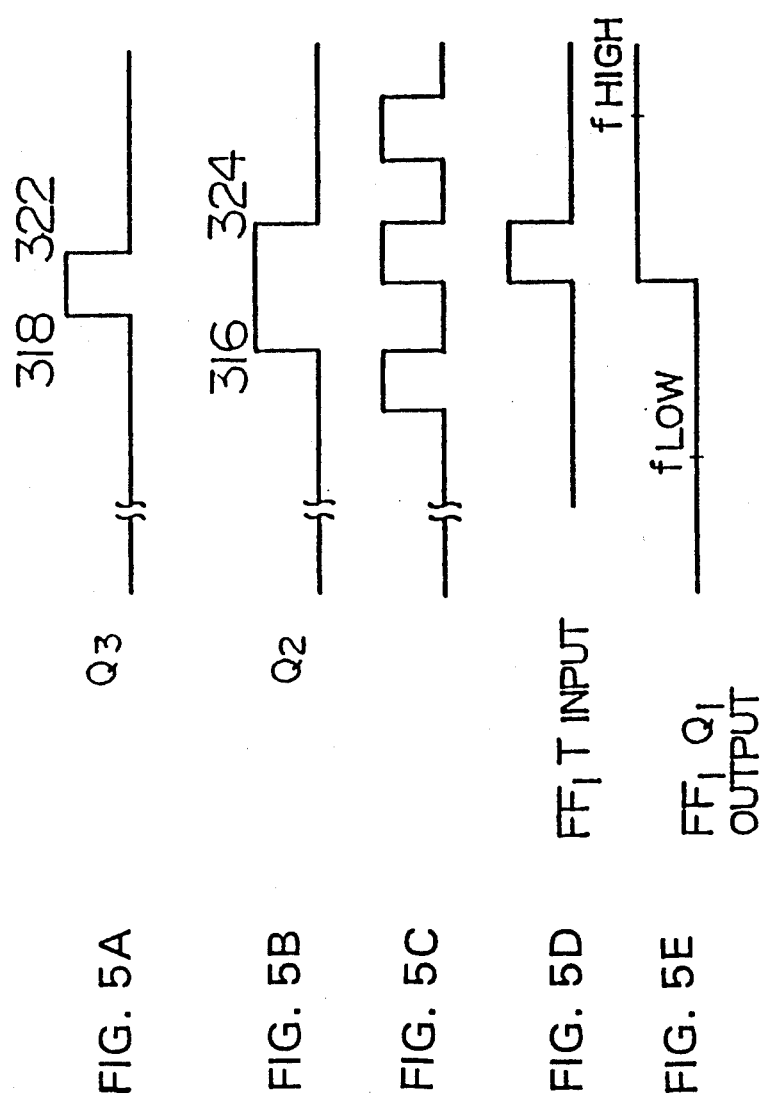
FIGS. 5A–5E and FIGS. 6A–6K are timing charts which respectively show the operations of a $$\frac{1}{320}$$
Figure 7:
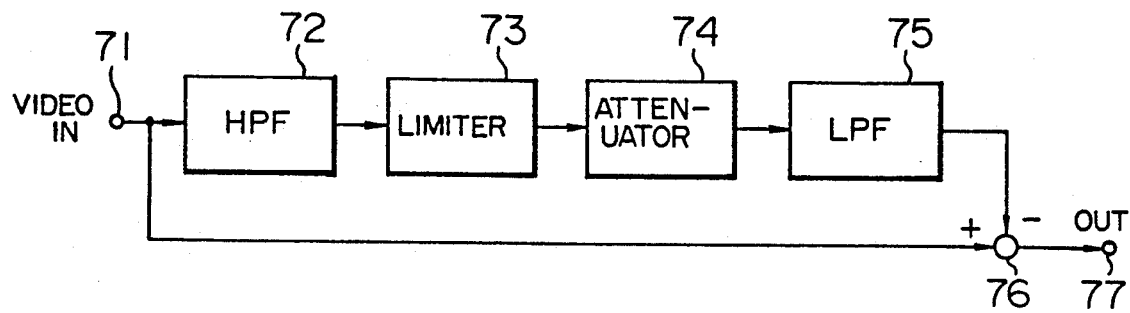
Figure 8:
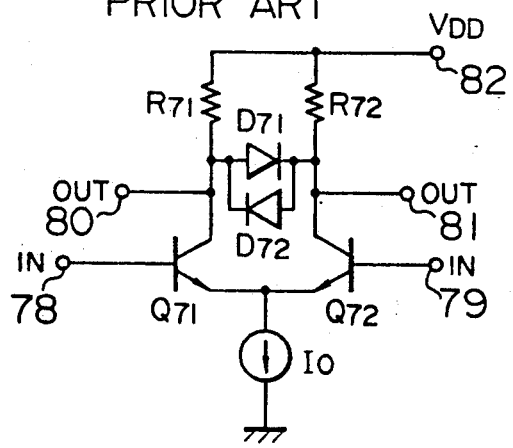
Figure 9A:
Figure 9B:
Figure 9C:
Figure 10:
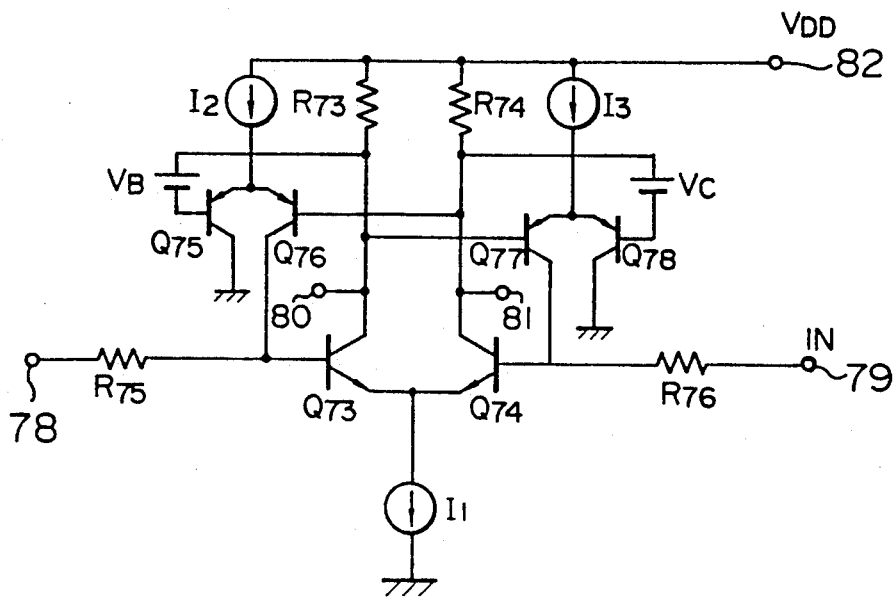
Figure 13:
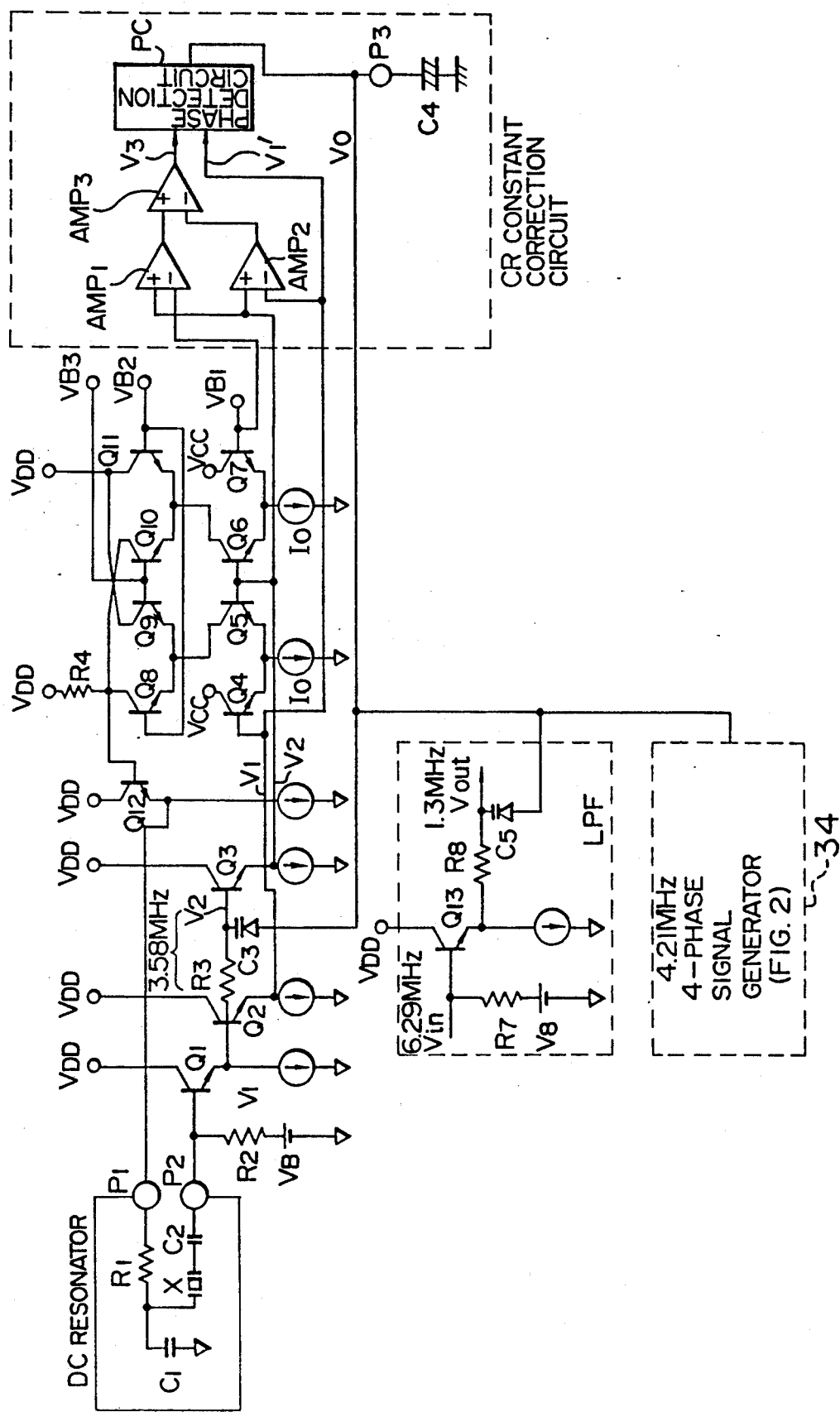
Figure 14:
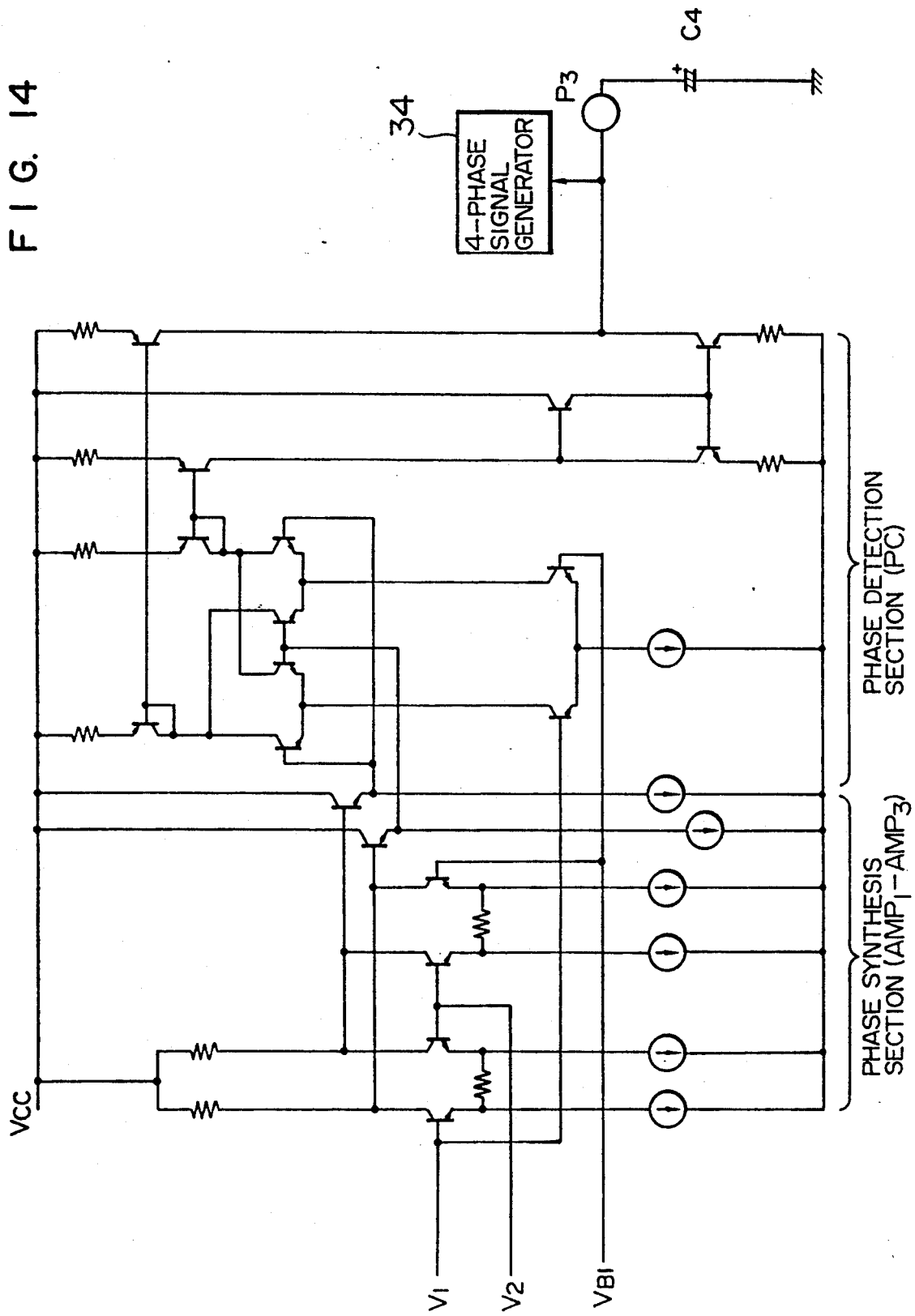
Figure 15:
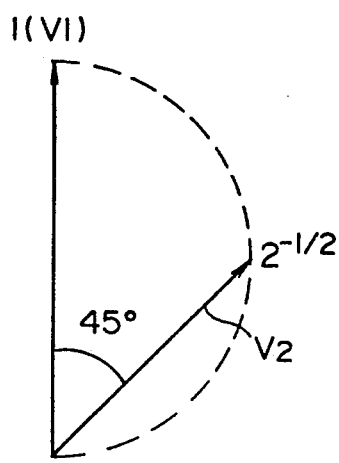
Figure 16:
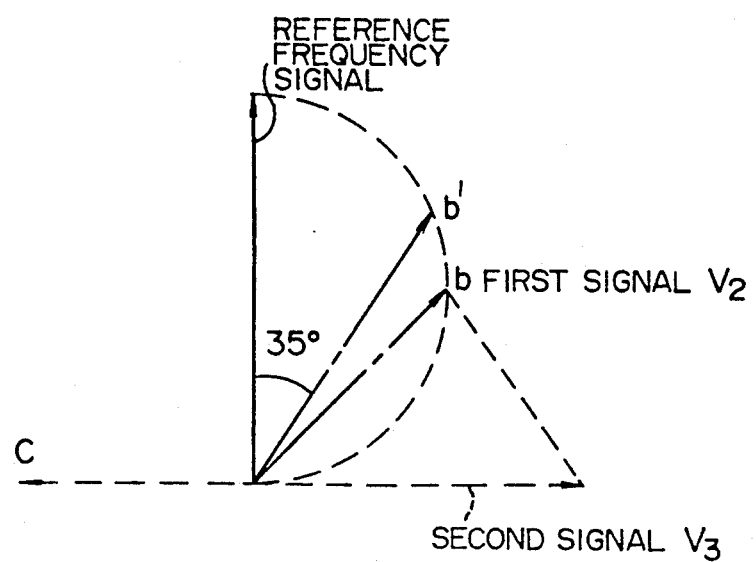

divider circuit (or 320 counter) and a shift register shown in FIG. 4;

FIG. 7 is a block diagram of a conventional noise suppression circuit for a luminance signal processing circuit;

FIG. 8 is a circuit diagram showing a conventional example of a limiter circuit shown in FIG. 7;

FIGS. 9A to 9C show waveforms for explaining a characteristic of the conventional limiter and a characteristic of a limiter circuit according to the present invention;

FIG. 10 is a circuit diagram of a non-linear signal compression circuit according to an embodiment of the present invention;

FIG. 11 is a diagram showing a dynamic emphasis circuit;

FIG. 12 is a diagram showing frequency-to-response characteristics of a dynamic emphasis circuit shown in FIG. 11;

FIG. 13 is a circuit diagram of a CR constant control circuit according to an embodiment of the present invention;

FIG. 14 is a circuit diagram showing a specific example of a phase synthesis section and a phase detection section shown in FIG. 13;

FIG. 15 is a vector diagram of a signal passed through the CR constant control circuit shown in FIG. 13; and FIG. 16 is a vector diagram for explaining a control operation of the CR constant control circuit shown in FIG. 13.

DESCRIPTION OF THE PREFERRED EMBODIMENTS

Embodiments of the present invention will now be explained with reference to the accompanying drawings. Throughout the figures, the same reference numeral or symbol designates the same or equivalent component or part.

FIG. 1A shows in circuit block diagram form the construction of a recording system (or mode) of a VTR or video signal recording/reproducing apparatus according to an embodiment of the present invention.

In FIG. 1A, reference numeral 1 designates an input terminal to which a video signal to be recorded is supplied, numeral 2 a low-pass filter (LPF), numeral 3 a dynamic emphasis circuit, numeral 4 a pre-emphasis circuit, numeral 5 a frequency modulation (FM) circuit, numeral 6 a high-pass filter (HPF), numeral 7 a band-pass filter (BPF), numeral 8 a frequency converter, numeral 9 an LPF, numeral 10 an adder, numeral 11 a recording signal amplifier, and numeral 12 a recording magnetic head. As is known in a VHS VTR circuit, a luminance signal separated from the input video signal supplied to the input terminal 1 is subjected to dynamic emphasis and frequency modulation through the blocks 2 to 6 while a color signal of the input video signal is subjected to a frequency conversion to lower band through the blocks 7 to 9, and the luminance signal and the color signal are thereafter summed by the adder 10 and are recorded on a recording medium by the recording head 12.

FIG. 1B shows in circuit block diagram form the construction of a recording (or playback) system (or mode) of a VTR according to an embodiment of the present invention.

In FIG. 1B, reference numeral 14 designates a reproducing magnetic head, numeral 15 a reproducing head signal amplifier, numeral 16 an HPF, numeral 17 a luminance signal frequency demodulation circuit, numeral 18 a de-emphasis circuit, numeral 19 a dynamic de-emphasis circuit, numeral 20 a noise cancellation circuit, numeral 21 an LPF, numeral 22 a frequency converter, numeral 23 a BPF, numeral 24 a comb filter, numeral 25 a signal adder, and numeral 26 an output terminal from which a reproduced signal is delivered. A composite reproduction signal picked up by the reproducing head 14 from the recording medium is amplified by the amplifier 15. Thereafter, the reproduced frequency-modulated luminance signal is demodulated through the blocks 16 to 20 and is converted into a video signal from which a horizontal synchronizing signal $f_H$ used for generation of a carrier signal is extracted. On the other hand, a lower-band converted color signal is extracted from the reproduced signal by the LPF 21 and is frequency-converted by the frequency converter 22 into a carrier color signal. The carrier color signal is passed through the BPF 23 and the comb filter 24 to remove therefrom unnecessary signal components which are produced due to the frequency conversion. Thereafter, the carrier color signal is added to the luminance signal in the adder 25 and delivered to the reproduction video signal output terminal 26.

An example of the IC configuration of the color signal processing apparatus for VTR shown in FIGS. 1A and 1B is disclosed by the ITEJ Technical Report by the present inventors which has already been mentioned.

Figure 2A:
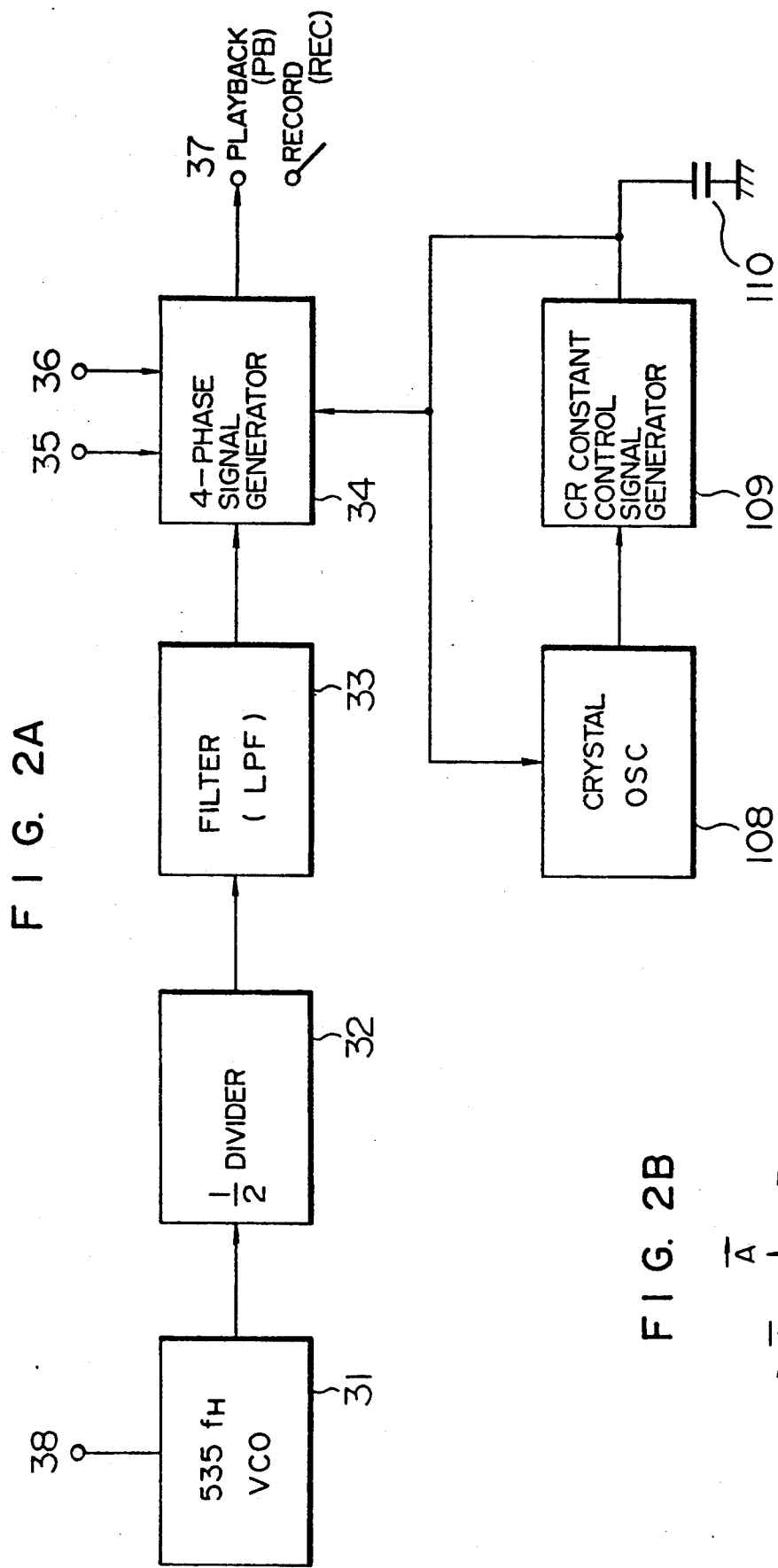
FIG. 2A is a circuit block diagram of a carrier signal generating circuit according to an embodiment of the present invention.

FIG. 2A shows in block diagram a phase shift type 4-phase carrier signal generating circuit according to an embodiment of the present invention. This carrier signal generating circuit is used for each of the frequency converters which are represented by the block 8 in FIG. 1A and the block 22 in FIG. 1B.

In FIG. 2A, reference numeral 31 designates a voltage controlled oscillator (VCO) which oscillates in the vicinity of the frequency of $535f_H$ to generate a $535f_H$ signal under a control voltage inputted to a terminal 38. Numeral 32 represents a ½ divider circuit for dividing the $535f_H$ signal by 2 for conversion thereof into a $$\frac{535}{2}f_H$$

signal, and numeral 33 represents a filter which permits the transmission of only the fundamental wave of $$\frac{535}{2}f_H$$

and may be a simple LPF or BPF since the nearest harmonic is $535f_H$ (about 8.4 MHz). The $$\frac{535}{2} f_H$$

signal including only the fundamental wave is supplied to a 4-phase signal generator circuit 34. The 4-phase signal includes four signals the phases of which are shifted from each other by 90°. The 4-phase signal is selected by a head change-over signal (of, for example, a VHS system) and a horizontal synchronizing signal inputted to input terminals 35 and 36 and is outputted as a carrier signal to an output terminal 37. The carrier signal is used for frequency conversion of a color signal. The 4-phase signal generator circuit 34 itself may be of a well-known type. However, in the illustrated example, it is connected to a CR constant control circuit shown in conjunction with an embodiment which will be explained later.

Figure 2B:
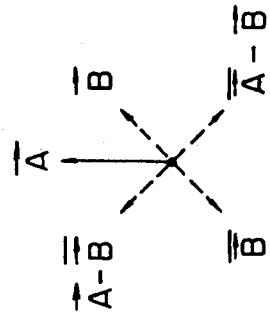
FIG. 2B is a diagram for explaining the operation of the circuit shown in FIG. 2A.

The CR constant control circuit includes a crystal oscillator 108, a CR constant control signal generator 109 and a capacitor 110 for holding a signal generated by the CR constant control signal generator 109. The CR constant control circuit controls the constant of a CR constant circuit having a vari-cap included in the 4-phase signal generator circuit 34 which is provided in an IC configuration. In the 4-phase signal generator circuit 34, a 45° delayed vector signal $\vec{B}$ is generated for an input signal vector $\vec{A}$ of, for example, 4.21 MHz by a primary CR circuit the CR product of which is controlled by the CR constant control circuit, and those signal vectors are subjected to vector operation to obtain vector signals $\vec{A}-\vec{B}$, $\vec{B}$ and $\vec{A}-\vec{B}$ as shown by broken lines in FIG. 2B. In this manner, a 4-phase signal including the vector signal $\vec{B}$ is obtained.

A semiconductor integrated circuit apparatus for color signal processing obtained by applying the present invention to the VTR apparatus shown in FIGS. 1A and 1B, is disclosed in Japanese Patent Application No. 1-157491 filed Jun. 19, 1989 by the present assignees, and is practiced by VHS YC1 Chip "HA118105" manufactured by Hitachi Ltd. The disclosure of the above Japanese patent application and the specification of "HA118105", especially, circuit layouts shown on pages 9 to 10 thereof, etc. are incorporated into the disclosure of this application by reference.

Figure 3A:
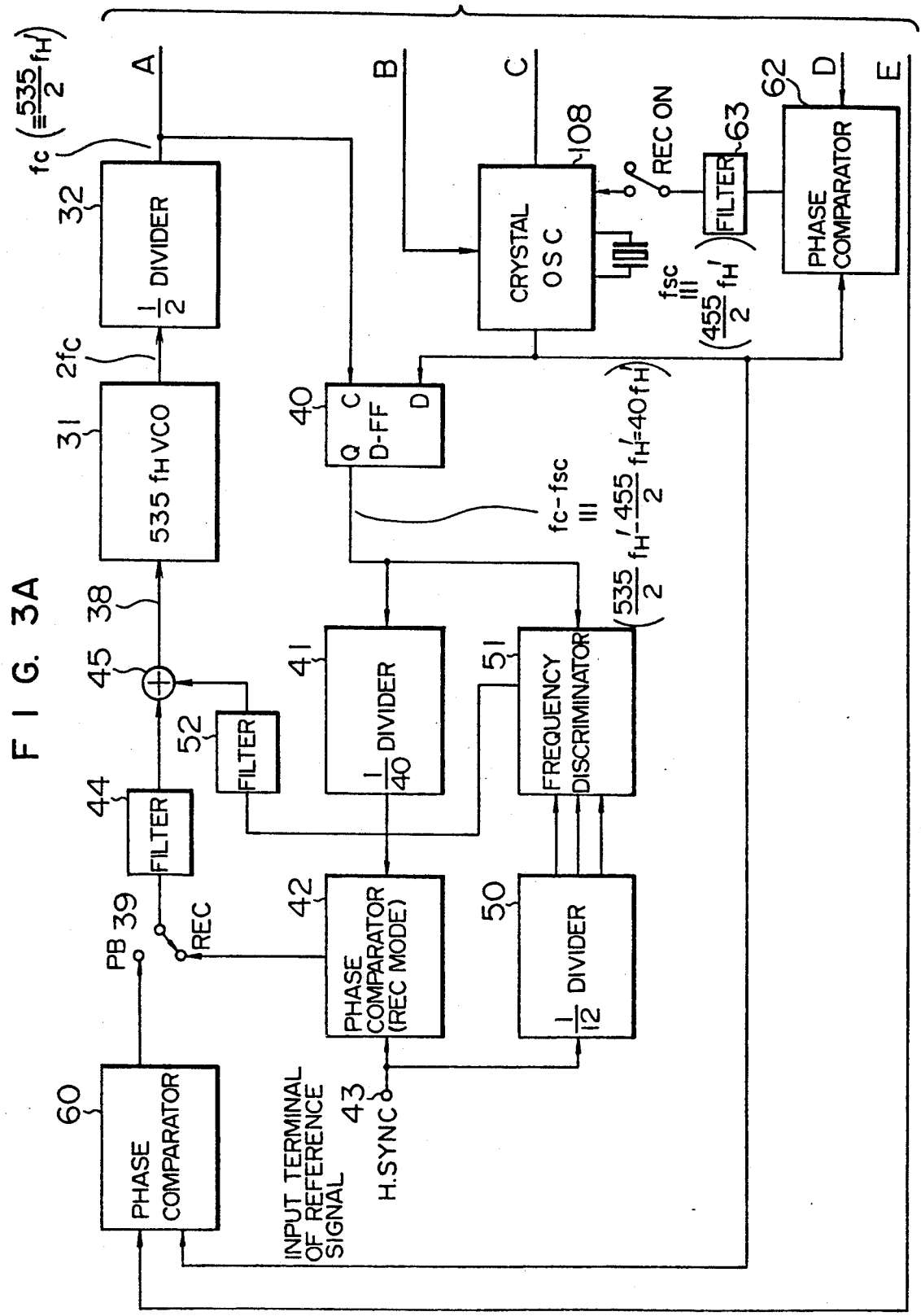

FIGS. 3A and 3B show as a whole the construction of a control system for a 535$f_H$ voltage controlled oscillator (VCO) according to an embodiment of the present invention. The control system is used as a system circuit for the frequency converter for recording or reproducing shown in FIG. 1A or 1B.

In FIGS. 3A and 3B reference numeral 40 designates a delayed flip-flop (D-FF) which receives at its clock input terminal a signal of the version $$f_C = \frac{535}{2} f_H'(f_H' \approx f_H)$$

of an oscillation frequency $2f_C$ from a 535$f_H$ VCO 31 divided by 2 in a ½ divider 32 and at its D input terminal a subcarrier signal $f_{SC}$ from a crystal oscillator 108 and generates at its output (Q or $\bar{Q}$) terminal a signal $$f_C - f_{SC} \left( = \frac{535}{2} f_H' - \frac{455}{2} f_H' \approx 40 f_H' \right)$$

representative of the result of subtraction of one of the two input signals from the other. The output of the D-FF 40 is applied to a 1/40 divider 41. Reference numeral 42 designates a phase comparator which compares the phase of an output $f_H'$ of the 1/40 divider 41 with the phase of the frequency $f_H$ of a horizontal synchronizing signal from a reference signal input terminal 43 and supplies the detected phase difference to the VCO 31 through a filter 44. Thus, the blocks 31, 32, 40, 41, 42 and 44 form a PLL (phase-locked loop) circuit.

The output of the D-FF 40 is also inputted to a frequency discriminator (or frequency detector) 51. The frequency discriminator 51 further receives, as a reference input to be compared, the output of a 1/12 divider 50 in which the frequency of the horizontal synchronizing signal from the reference signal input terminal 43 is divided by 12. As a result, the frequency discriminator 51 detects a phase error. The detected error component is converted into a DC level through a filter 52 and is thereafter applied as a control voltage to the VCO 31 through an adder 45. The phase comparator 42 is used in a record mode and the frequency discriminator 51 is indispensable for prevention of an erroneous operation in a record mode and in a reproduction (or playback) mode. Since the D-FF 40 is used for obtaining the difference signal $f_C-f_{SC}$, a linear converter required in the conventional system and having a complicated construction is not necessary and any unnecessary signal component inevitably produced through linear conversion is not generated. This is because the frequency conversion is also digitally made. The use of the D-FF is more advantageous for IC formulation.

In FIGS. 3A and 3B, reference numeral 53 designates an input terminal of a signal to be frequency-converted upon recording/reproducing, numeral 54 a frequency converter for converting a color signal of 3.58 MHz into a lower-band frequency of 629 KHz, numeral 55 a record/reproduction (playback) mode change-over switch, numeral 56 an LPF for use in a record mode, numeral 57 an output terminal of a signal converted to a lower-band frequency upon recording or an output terminal of a 629 KHz band color signal, numeral 58 a BPF, and numeral 59 an output terminal of a signal frequency-converted upon reproducing or an output terminal of a 3.58 MHz band color signal. The output of the BPF 58 is also supplied to one input of a phase comparator 60. The other input of the phase comparator 60 is the $f_{SC}$ frequency output from the subcarrier signal generator 108.

The phase comparator 60 compares the phase of the output of the BPF 58 with the phase of the $f_{SC}$ frequency output from the subcarrier signal generator 108 and a phase difference therebetween is converted into a DC level by the filter 44 and is thereafter applied as a control voltage to the VCO 31. The blocks, 31, 60 and 44 form a second PLL circuit.

In record mode, a switch 61 is turned into an activated condition so that the 3.58 MHz band color signal is applied from the input terminal 53 to one input of a phase comparator 62. The subcarrier $f_{SC}$ from the subcarrier signal generator 108 is applied to the other input of the phase comparator 62. A phase difference component as the result of comparison by the phase comparator 62 is converted by a filter 63 into a DC voltage component which in turn adjusts a CR circuit in the crystal oscillator 108. A control voltage from a CR constant control signal generator 109 is supplied to the oscillator 108, the 4-phase signal generator 34 and the LPF 56 to effect a function of correcting the CR constant.

FIG. 4 is a circuit diagram showing a specific example of the frequency discriminator 51. The frequency discriminator 51 includes a 1/320 divider circuit 65 which receives as its clock input the $40f_H$ signal from the D-FF 40 and comprises a 320 counter, a flip-flop (FF) 66 for input/output timing control, and a shift register 64 including registers 67 to 69 which receive timing pulses from a 1/12 divider circuit 50 to shift an error signal discriminated by the divider circuit 65, whereby an error signal is prevented from continuously generating in the frequency discrimination operation and harmonic components of the color burst signal V are removed.

The 320 counter 65 receives from the divider circuit 50 a gate pulse (8H) for control of the clock of the counter and a reset pulse for the resetting of the counter and the outputting of a discrimination error so that an error signal obtained by counting as clocks the down-converted $40f_H$ from the VCO 31 are outputted to the register 69 from $Q_1$ to $Q_3$ output terminals (see timing charts shown in FIGS. 5A-5E and FIGS. 6A-6K.

Figure 6:
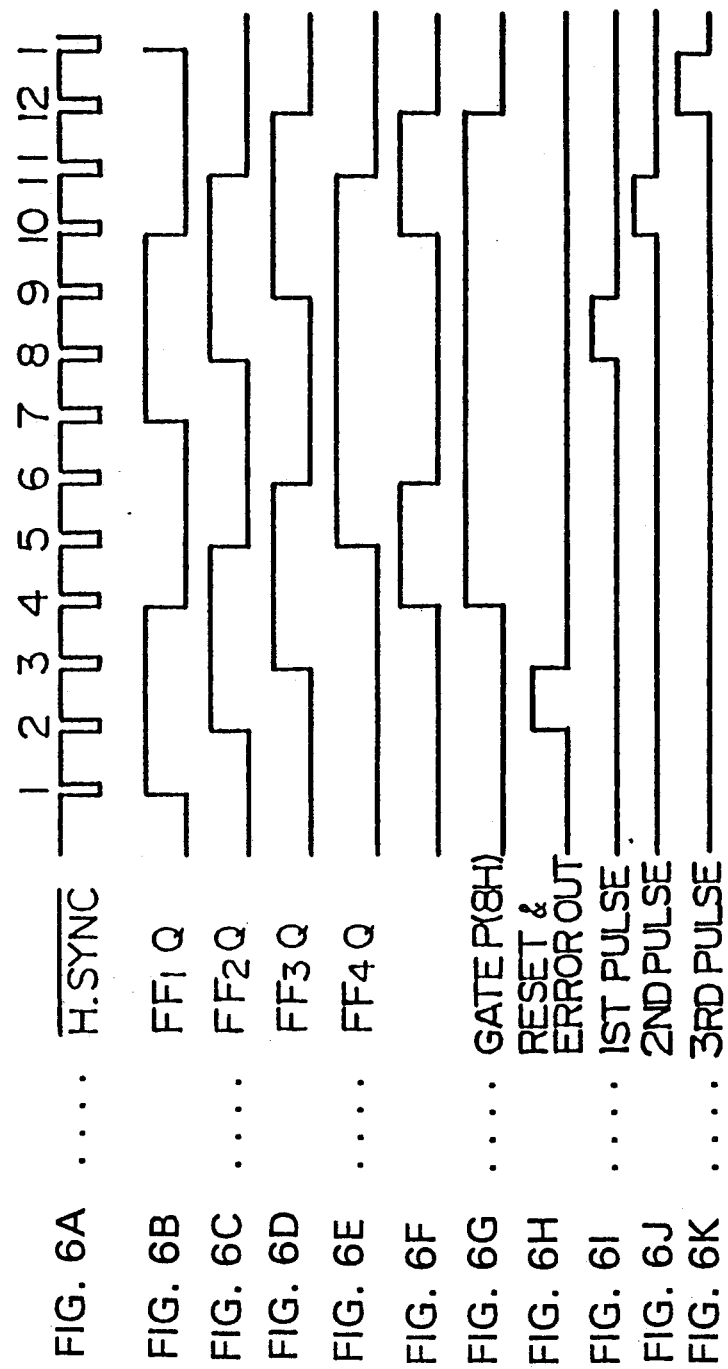

The 1/12 divider circuit 50 generates the above-mentioned pulses (gate pulse and reset pulse) supplied to the 320 counter 65, a first pulse for shifting data of the register 68 to the register 67, a second pulse for shifting data of the register 69 to the register 68 and a third pulse to be supplied to the register 69 for indicating the end of the count cycle of the counter of the 1/12 divider circuit 50 (see the timing chart shown in FIG. 6). In this manner, the 1/12 divider circuit 50 discriminates the error of the frequency $40f_H$ at every 12H period.

In the shift register 64, the results of discrimination carried out three times during a period of time which is three times as long as the 12H period are stored into the registers 67, 68 and 69 in the order of first-in. In the case where the same error generates continuously, a current corresponding to the condition of the error is outputted during a discrimination output period or the reset period of the 320 counter 65. Accordingly, a discrimination error generated once or twice due to skew upon channel change-over is cancelled so that no error is outputted. In addition, an erroneous operation due to dropouts caused upon pickup of a signal from the recording medium is eliminated. In the case where a discrimination error continues during a predetermined period of time (for example, equal to or longer than 3H) so that the error is ultimately outputted, an automatic phase control (APC) OFF pulse is generated so that the generation of a burst gate pulse (BGP) for APC is stopped, thereby preventing side lock caused by a reverse operation of the frequency discriminator and the APC circuit.

A semiconductor integrated circuit including circuits shown in conjunction with the embodiments of FIGS. 3 to 6 is implemented by "HA118105C" chip manufactured by Hitachi Ltd. and the chip specification is incorporated into the disclosure of this application by reference.

Next, an embodiment of a non-linear signal compression circuit used for luminance signal processing in the dynamic emphasis circuit 3, the dynamic de-emphasis circuit 19 and the noise cancellation circuit 20 will be explained in reference to FIG. 10.

In FIG. 10, reference numerals 78 and 79 designate input terminals, numerals 80 and 81 output terminals, symbols $Q_{73}$ and $Q_{74}$ a first pair of differential amplifier NPN transistors, symbols $Q_{75}$ and $Q_{76}$ a second pair of differential amplifier PNP transistors, symbols $Q_{77}$ and $Q_{78}$ a third pair of differential amplifier transistors, symbols VB and $V_C$ voltage circuits for level shift for providing differential voltages which determine the width of amplitude limitation, and symbols $R_{75}$ and $R_{76}$ negative feedback resistors for applying negative feedbacks by the bi-polar transistor $Q_{75}$ to $Q_{78}$ to the bi-polar transistors $Q_{73}$ and $Q_{74}$.

In the case where the potentials on the input terminals 78 and 79 are substantially the same, the transistors $Q_{76}$ and $Q_{77}$ are in their turned-off conditions since the potentials on the output terminals 80 and 81 and the potentials of the bases of the transistors $Q_{75}$ and $Q_{78}$ are set to be lower than those of the output terminals 80 and 81 with the potentials $V_B$ and $V_C$ being set to be equal to each other. Therefore, no negative feedback is applied. On the other hand, in the case where a signal developing in a positive direction is inputted to the input terminal 78, the potential of the output terminal 80 is lowered so that the transistor $Q_{77}$ is turned on. Therefore, a current $I_3$ is branched or diverted to the PNP transistors $Q_{77}$ and $Q_{78}$ and hence the base potential of the transistor $Q_{74}$ is raised by virtue of the resistor $R_{76}$ so that the branch of a current $I_1$ by the transistors $Q_{73}$ and $Q_{74}$ is suppressed to a certain level. As a result, a change in voltage of the terminal 80 is subject to limitation and hence the output amplitude is subject to limitation.

On the contrary, in the case where a signal developing in a negative direction is inputted to the input terminal 78, the potential of the output terminal 81 is lowered and hence the base potential of the transistor $Q_{73}$ is raised to a higher level than the potential of the input terminal by virtue of the transistor $Q_{76}$ and the resistor $R_{75}$ so that changes in potential of the output terminals 80 and 81 are subject to limitation.

Since the negative feedbacks are continuously effected by the differential characteristics of the second and third pairs of differential amplifier transistors, the limiter has an amplitude-limited output waveform including no folding or inflection point, as shown by solid line 86 in FIG. 9C. Regarding the frequency response, an amplitude limitation characteristic having no frequency dependency is provided by using differential amplifier transistors each of which exhibits a planar characteristic in a band of the video signal. Also, the output waveform takes a non-linearly compressed version of the input signal since the negative feedback is continuously applied.

FIG. 11 shows an example in which the non-linear signal compression circuit having the above-mentioned construction is applied to the dynamic emphasis circuit 3 of a luminance signal processing system in a record mode of the VTR. The non-linear signal compression circuit has a first input terminal coupled to an input terminal of a video signal through a resistor $R_{81}$, a second input terminal through an LPF which is composed of a resistor $R_{82}$ and a capacitor $C_{81}$, and a single output terminal which delivers an output to an adder 87. The adder 87 makes the sum of the video signal applied directly from the video signal input terminal and the single output terminal of the non-linear signal compression circuit to output it. The non-linear signal compression circuit serves as a high-pass filter (HPF) and a dynamic limiter in combination with the LPF which includes the resistor $R_{82}$ and the capacitor $C_{81}$.

FIG. 12 shows the frequency versus response characteristic of the dynamic emphasis circuit shown in FIG. 11 with an input level being taken as a parameter.

FIG. 13 shows a circuit diagram of an embodiment of a CR constant control circuit according to the present invention. Circuit elements shown in FIG. 13 are formed through known semiconductor integrated circuit fabrication techniques on a monolithic semiconductor substrate which may be a monocrystalline, silicon substrate, but the invention is not so limited. Capacitors $C_1$, $C_2$ and $C_4$, a resistor $R_1$ and a crystal oscillator X connected to the circuit through external terminals $P_1$ to $P_3$ are provided as externally mounted parts.

The resistors $R_1$, the capacitors $C_1$ and $C_2$ and the crystal oscillator X connected through the external terminals $P_1$ and $P_2$ form a crystal oscillator circuit together with an amplifying circuit formed in the semiconductor integrated circuit. A reference frequency signal produced by this oscillator circuit is derived from the terminal $P_2$ and is supplied to an emitter-follower circuit which is composed of a transistor $Q_1$ and a constant current source provided to the emitter of the transistor $Q_1$. The emitter-follower circuit serves as a buffer amplifier to effect impedance conversion.

The emitter output $V_1$ of the transistor $Q_1$ (or the reference frequency signal) is inputted, on one hand, to a CR constant circuit which is composed of a resistor $R_3$ and a capacitor $C_3$. The constants of the resistor $R_3$ and the capacitor $C_3$ are determined such that the CR constant circuit produces an output signal $V_2$ the phase of which is in advance of that of the reference frequency signal $V_1$ by 45° and the level of which is $2^{-\frac{1}{2}}$ of that of the reference frequency signal $V_1$, as shown in FIG. 15. The capacitor $C_3$ is constructed by a vari-cap.

In FIG. 13, the signal $V_2$ is outputted as a first signal $V_2'$ through an emitter-follower circuit which is composed of a transistor $Q_3$ and a constant current source therefor. The reference frequency signal $V_1$ obtained from the emitter of the transistor $Q_1$ is outputted, on the other hand, as a signal $V_1'$ through an emitter-follower circuit which is composed of a transistor $Q_2$ and a constant current source therefor.

The reference frequency signal $V_1'$ ($=V_1$) and the signal $V_2'$ ($=V_2$) having a phase which is delayed from the signal $V_1'$ by 45° and a level which is $2^{-\frac{1}{2}}$ of the signal $V_1$ as mentioned above, are inputted to the subsequent phase synthesis circuit.

In differential amplifier circuits $AMP_1$, $AMP_2$ and $AMP_3$ which operate linearly with respect to the signals $V_1'$ and $V_2'$, signal $V_2'$ is inputted to inverting terminals such that it has a reverse phase at an output of the amplifier $AMP_1$, signals $V_1'$ and $V_2'$ are respectively inputted to a non-inverting input of the amplifier $AMP_2$ which has the same phase as the output of the amplifier $AMP_2$ and the inverting input thereof which has a phase reverse to the output of the amplifier $AMP_2$. The outputs of the amplifiers $AMP_1$ and $AMP_2$ are inputted to the amplifier $AMP_3$ so that it performs a summing operation.

With the above construction, in the case where $V_2'$ has a phase lag of 45° relative to $V_1$, the amplifier $AMP_3$ outputs a second signal $V_3$ which has a phase lag of 90° relative to $V_1'$.

The collector of a transistor $Q_5$ forms a signal c (shown in FIG. 16) which is the vector composition of a signal having a phase reverse to the signal $V_2'$ supplied to the base of the transistor $Q_5$ and a signal having the same phase as the signal $V_1'$. The phase of the signal c is reverse to that of the signal $V_3$ and the level thereof is equal to that of the signal $V_3$. The signal c is supplied to the common emitters of differential amplifier transistors $Q_8$ and $Q_9$ which form a phase synthesis circuit. The collector of a transistor $Q_6$ forms a signal d reverse in phase to the signal $V_2'$ since a bias voltage $VB_1$ is supplied to the base of a transistor $Q_7$ which forms a differential amplifier together with the transistor $Q_6$. The signal d is supplied to the common emitters of differentially operative transistors $Q_{10}$ and $Q_{11}$ which form a phase synthesis circuit. By connecting the collectors of the transistors $Q_8$ and $Q_{10}$ in common with each other, a vector composite signal of the signals c and d is obtained and is fed back to the terminal $P_1$ through an emitter-follower circuit which is composed of a transistor $Q_{12}$ and a constant current source therefor. The bases of the transistors $Q_8$ and $Q_{11}$ are commonly coupled and are applied with a bias voltage $VB_2$. The bases of the transistors $Q_9$ and $Q_{10}$ are commonly coupled and are applied with a bias voltage $VB_3$. In order to make the feedback signal have a constant gain, a resistor $R_4$ is provided to the collectors of the transistors $Q_8$ and $Q_9$. In this manner, the oscillating operation of the above-mentioned crystal oscillator circuit is effected.

The output signal $V_3$ of the phase synthesis circuit ($AMP_1$ to $AMP_3$) and the reference frequency signal $V_1'$ are supplied to a phase detection circuit PC. The output of the phase detection circuit PC is externally connected through the external terminal $P_3$ to the capacitor $C_4$ which has a relatively large capacitance value (for example, 100 μF). The capacitor $C_4$ has a jitter absorbing function. A control voltage $V_O$ outputted from the phase detection circuit PC serves as a control voltage for the capacitor $C_3$ in accordance with a phase difference between the signals $V_1'$ and $V_3$. FIG. 14 shows a specific example of each of the phase synthesis circuit ($AMP_1$ to $AMP_3$) and the phase detection circuit (PC).

A vector composite voltage by the resistor $R_3$ and the capacitor $C_3$ in the CR constant circuit becomes equal to the reference frequency signal $V_1$ and a phase difference between the voltages at the resistor $R_3$ and the capacitor $C_3$ is maintained to be 90°. Accordingly, in the case where the constant of each of the resistor $R_3$ and the capacitor $C_3$ changes from a set value due to a manufactural fluctuation, a locus of the voltage $V_2$ obtained at the capacitor $C_3$ takes the form of a semi-circle as shown by dotted line in FIGS. 15 and 16. This is well known as a circle diagram in a CR series circuit. For example, when the capacitance value of the capacitor $C_3$ is made smaller than the set value, the signal b ($=V_2$) has a smaller phase lag (for example, 35°) and a correspondingly larger level, as indicated by b' in FIG. 16. Accordingly, a voltage $V_3$ formed by the phase synthesis circuit with reference being made to such a signal b has a phase difference smaller than 20° from $V_1'$. The phase detection circuit PC makes the control voltage $V_O$ large in accordance with the magnitude of the phase difference. Since a fixed DC bias voltage ($V_B = V_{BE}$) is supplied to the cathode side of the capacitor (or vari-cap) $C_3$, the increase of the control voltage $V_O$ makes a reverse bias voltage of a PN junction correspondingly small so that the capacitance value of the capacitor $C_3$ is made large. Thereby, a signal $V_2$ can be obtained which has a relationship in phase and level as shown by a solid line in FIGS. 15 and 16.

On the contrary, when the capacitance value of the capacitor $C_3$ is made larger than the set value, a phase difference between the signals $V_3$ and $V_1'$ becomes larger than 90° and hence the control voltage $V_O$ is made small. As a result, the capacitance value of the capacitor $C_3$ is made small, in contrast with the above-mentioned case, thereby making it possible to obtain such a signal $V_2$ as mentioned above.

The above holds for the case where the resistance value of the resistor $R_3$ has a fluctuation. This is because the phase and level of the signal $V_2$ are determined by a relationship in impedance between the resistor $R_3$ and the capacitor $C_3$. Namely, when there is a manufactural fluctuation which yields a smaller resistance value of the resistance $R_3$, a voltage generated at the resistance $R_3$ becomes small. Correspondingly, a voltage $V_2$ generated at the capacitor $C_3$ becomes large. As a result, the phase of the voltage $V_2$ is in advance of the reference phase lag 45°, like the case where the capacitance value of the capacitor $C_3$ is made smaller than the set value. On the contrary, when there is a manufactural fluctuation which yields a larger resistance value of the resistor $R_3$, a voltage generated at the resistor $R_3$ becomes large and hence a voltage $V_2$ generated at the capacitor $C_3$ becomes correspondingly small so that the phase of the voltage $V_2$ is delayed from the reference phase lag 45°, like the case where the capacitance value of the capacitor $C_3$ is made larger than the set value.

As shown by circuits enclosed by dotted lines in FIG. 13, a resistor $R_8$ and a capacitor $C_5$ similar to the above-mentioned resistor $R_3$ and capacitor $C_3$ are provided in proximity to the resistor $R_3$ and the capacitor $C_3$. The above-mentioned control voltage $V_O$ is also supplied to the capacitor $C_5$. The CR constant of the resistor $R_8$ and the capacitor $C_5$ has a fluctuation similar to that of the resistor $R_3$ and the capacitor $C_3$. By supplying the control voltage $V_O$ so as to compensate for the fluctuation of the CR constant of the resistor $R_8$ and the capacitor $C_5$, a highly precise CR constant can be obtained like the CR constant of the resistor $R_3$ and the capacitor $C_3$. Thereby, a CR constant circuit free of the necessity of adjustment can be obtained. When this CR constant circuit is used as, for example, a low-pass filter (LPF), an input signal $V_{in}$ is supplied through an emitter-follower circuit, which is composed of a transistor $Q_{13}$ and a constant current source therefor, which is similar to the above-mentioned emitter-follower circuit including the transistor $Q_1$. In this case, the base of the transistor $Q_{13}$ is supplied with a bias voltage VB as mentioned above.

The above CR constant circuit may be constructed as an emitter capacitance coupled multivibrator to provide a $535f_H$ oscillator circuit.

In FIG. 13, the bias terminal $VB_3$ may be supplied with a voltage for compensating for a phase difference from the reference frequency signal. For example, in a color signal processing circuit for a VTR, a control voltage corresponding to a phase difference between a color subcarrier and the above-mentioned oscillation frequency is supplied during the record mode. Thereby, the phase of a feedback signal supplied by the phase synthesis circuit to the terminal $P_1$ in the oscillator circuit is controlled. As a result, the above-mentioned crystal oscillator operates at an oscillation frequency corresponding to the color subcarrier. A signal generated by the crystal oscillator circuit is used as a carrier for forming a lower-band converted color signal for the record mode since the oscillation frequency is controlled. In reproduction (or playback) mode, since variations of the above-mentioned control signal are made zero (bias voltage $VB_3$), a highly stable oscillation operation controlled so as to compensate for the fluctuation of the CR constant, as mentioned above, is performed. Thereby, it is possible to make reverse conversion of the color signal in reproduction mode.

The two signals $V_3$ and $V_1'$ taken out by the phase synthesis circuit and phase-detected may be arbitrary so long as they correspond to voltages generated by the resistor and the capacitor in the above-mentioned CR constant circuit. For example, in FIG. 16, the signal $V_3$ may be replaced by a signal c reverse in phase to the signal $V_3$.

In the case where a feedback amplification function for causing the oscillation operation of the crystal oscillator and a frequency control function are added by the phase synthesis circuit, the combination in the embodiment shown in FIG. 13 is optimum.

A circuit for making the DC level conversion of voltages corresponding to the voltages generated at the resistor and the capacitor forming the CR constant circuit may be constructed in various configurations. The capacitor forming the CR constant circuit may be arbitrary so long as the capacitance value thereof can be changed by a voltage signal.

The present invention is widely applicable to a variety of CR constant circuits incorporated in a semiconductor integrated circuit.

What is claimed is:

1. A carrier signal generating circuit in a video signal recording/reproducing apparatus in which a carrier color signal having a subcarrier frequency $f_{SC}$ is recorded or reproduced after frequency conversion thereof to a lower-band signal, the phase of the lower-band signal being shifted in synchronism with a horizontal synchronizing signal which is included with the carrier color signal in a video signal to be recorded or reproduced, said carrier signal generating circuit comprising:
   a phase-locked loop circuit including:
      first oscillator means for providing an output signal oscillating at a frequency which is K/L times as high as the sum $f_c = f_{sc} + M/N * f_H$, where $f_{sc}$ is a subcarrier frequency of the carrier color signal, and at a frequency M/N times as high as a frequency $f_H$ of the horizontal synchronizing signal, each of M, N, K and L being an integer;
      first divider means for frequency-dividing the output signal of said first oscillator means by K/L;
      subtracting means for subtracting the subcarrier frequency from an output of the first divider means; and
      phase comparator means for comparing the phase of an output of the subtracting means and the phase of the horizontal synchronizing signal; and
   circuit means for generating from an output of said first divider means a carrier signal having a phase that is shifted in synchronism with the horizontal synchronizing signal.

2. A carrier signal generating circuit according to claim 1, wherein said first oscillator means includes a voltage controlled oscillator, and said subtracting means includes delayed flip-flop circuit means for receiving the output of said first divider means as a clock input and the subcarrier frequency $f_{sc}$ signal as another input to thereby output a signal $40f_H'$, and second divider means for frequency-dividing the output of said delayed flip-flop circuit means and for outputting a signal corresponding to the horizontal synchronization frequency, said phase comparator means compares the phase of the output signal of said second divider means and the phase of said horizontal synchronizing signal as a reference and outputs a signal representative of a phase difference therebetween, and wherein said phase-locked loop further includes first filter means for converted said phase difference signal into a corresponding voltage value and for applying the corresponding voltage value to a voltage control input of said voltage controlled oscillator.

3. A carrier signal generating circuit according to claim 2, further comprising a frequency error correction circuit for detecting and correcting an error in a voltage control input signal provided to said voltage controlled oscillator, said frequency error correction circuit including third divider means for frequency-dividing said horizontal synchronizing signal by a predetermined number, frequency discriminator means for comparing the output signal of said delayed flip-flop circuit means with an output signal of said third divider means and for outputting a difference frequency signal representative of a difference in frequency between the signals compared, and second filter means for converting said difference frequency signal into a corresponding voltage value and for applying it to the voltage control input of said voltage controlled oscillator.

4. A carrier signal generating circuit according to claim 3, wherein said frequency discriminator means includes a frequency dividing circuit for frequency-dividing the output of said delayed flip-flop circuit means under control of a gate pulse and a reset pulse from said third divider means, shift register means including a plurality of registers for shifting a frequency-divided output from said frequency discriminator means in accordance with a shift pulse from said third divider means, and a discrimination output circuit for converting a digital output from said shift register into an analog output.

5. A carrier signal generating circuit according to claim 3, wherein said frequency error correction circuit is arranged to operate during both recording and reproducing operations.

6. A carrier signal generating circuit as claimed in claim 1, wherein said circuit means further comprises second oscillator means for generating and outputting said subcarrier frequency $f_{SC}$ signal.

7. A carrier signal generating circuit as claimed in claim 1, wherein said circuit means further comprises means for providing a control voltage signal for controlling the output of said first oscillator means.

8. A carrier signal generating circuit as claimed in claim 1, wherein said circuit means includes a four-phase signal generator circuit for receiving an output of the first divider means, and for generating and outputting a four-phase signal in accordance therewith for modulating a record/playback signal.

9. A carrier signal generating circuit as claimed in claim 8, further comprising a CR constant control circuit for controlling the four-phase signal generator circuit.

10. A carrier signal generating circuit as claimed in claim 8, wherein said circuit means further includes filter means for passing only selected frequencies of an output of said first divider means to said four-phase signal generator circuit.

11. A carrier signal generating circuit as claimed in claim 1, wherein said circuit means includes a four-phase signal generator circuit for receiving an output of the first divider means, and for generating and outputting a four-phase signal in accordance therewith for modulating a playback signal.

12. A carrier signal generating circuit as claimed in claim 11, wherein said circuit means further includes a frequency converter for frequency converting the playback signal in accordance with the four-phase signal, and phase comparator means for comparing the phase of the playback signal and the phase of the subcarrier frequency $f_{SC}$ signal, and for outputting a corresponding signal for controlling said first oscillator means.

13. A carrier signal generating circuit as claimed in claim 11, further comprising a CR constant control circuit for controlling the four-phase signal generator circuit.

14. A carrier signal generating circuit as claimed in claim 11, wherein said circuit means further includes filter means for passing only selected frequencies of an output of said first divider means to said four-phase signal generator circuit.

15. A video signal recording/reproducing apparatus in which a carrier color signal having a subcarrier frequency $f_{SC}$ is recorded or reproduced after frequency conversion thereof to a lower-band signal, the phase of the lower-band signal being shifted in synchronism with a horizontal synchronizing signal which is included with the carrier color signal in a video signal to be recorded or reproduced, further comprising:

a carrier signal generating circuit including:
a phase-locked loop circuit including:
first oscillator means for providing an output signal oscillating at a frequency which is K/L times as high as the sum $f_c = f_{sc} + M/N * f_H$, where $f_{sc}$ is a subcarrier frequency of the carrier color signal, and a frequency M/N times as high as a frequency $f_H$ of the horizontal synchronizing signal, each of M, N, K and L being an integer;

first divider means for frequency-dividing the output signal of said first oscillator means by K/L;

subtracting means for subtracting the subcarrier frequency from an output of the first divider means; and first phase comparator means for comparing the phase of an output of the subtracting means and the phase of the horizontal synchronizing signal; and circuit means for generating from an output of said first divider means a carrier signal having a phase that is shifted in synchronism with the horizontal synchronizing signal.

16. The apparatus according to claim 15, wherein said first oscillator means includes a voltage controlled oscillator, and said subtracting means includes delayed flip-flop circuit means for receiving the output of said first divider means as a clock input and the subcarrier frequency $f_{sc}$ signal as another input to thereby output a signal $40f_H'$, and second divider means for frequency-dividing the output of said delayed flip-flop circuit means and for outputting a signal corresponding to the horizontal synchronization frequency, said first phase comparator means compares the phase of the output signal of said second divider means and the phase of said horizontal synchronizing signal as a reference and outputs a signal representative of a phase difference therebetween, and wherein said phase-locked loop further includes first filter means for converting said phase difference signal into a first corresponding voltage value and for applying the first corresponding voltage value to a voltage control input of said voltage controlled oscillator.

17. The apparatus according to claim 16, wherein said carrier signal generating circuit further includes third divider means for frequency-dividing said horizontal synchronizing signal by a predetermined number, frequency discriminator means for comparing the output signal of said delayed flip-flop circuit means with an output signal of said third divider means and for outputting a difference frequency signal representative of a difference in frequency between the signals compared, and second filter means for converting said difference frequency signal into a corresponding voltage value and for applying it to the voltage control input of said voltage controlled oscillator.

18. The apparatus according to claim 17, wherein said frequency discriminator means includes a frequency dividing circuit for frequency-dividing the output of said delayed flip-flop circuit means under control of a gate pulse and a reset pulse from said third divider means, shift register means including a plurality of registers for shifting the frequency-divided pulse signal from said delayed flip-flop circuit means in accordance with a shift pulse from said third divider means, and a discrimination output circuit for converting a digital output from said shift register into an analog output.

19. The apparatus according to claim 11, wherein said circuit means further comprises an adder for summing corresponding voltage values output by said first and second filter means before they are applied to the voltage control input of said voltage controlled oscillator during a recording operation.

20. The apparatus according to claim 16, wherein said circuit means further comprises a second phase-locked loop circuit, including said voltage controlled oscillator, said first divider means, means for receiving and processing a playback signal, and second phase comparator means for comparing the phase of the processed playback signal and the phase of the subcarrier frequency $f_{SC}$ signal and for outputting, during a reproducing mode, a signal representative of a phase difference therebetween, and said first filter means, wherein said first filter means further converts the output signal of said second phase comparator into a second corresponding voltage value and applies the second corresponding voltage value to a voltage control input of said voltage controlled oscillator.

21. The apparatus according to claim 20, wherein said second phase-locked loop circuit further includes a four-phase signal generator circuit for receiving an output of said first divider means and for generating and outputting a four-phase signal in accordance therewith, and wherein said playback signal receiving and processing means includes a frequency converter circuit for frequency converting the playback signal in accordance with the four-phase signal before providing it to the second phase comparator means.

22. A video signal recording/reproducing apparatus in which a carrier color signal having a subcarrier frequency $f_{SC}$ is recorded or reproduced after frequency conversion hereof to a lower-band signal, the phase of the lower-band signal being shifted in synchronism with a horizontal synchronizing signal, further comprising:

a carrier signal generating circuit including:
first oscillator means for providing a signal oscillating a frequency which is K/L times as high as the sum $f_c = f_{sc} + M/N \, f_H$, where $f_{sc}$ is a subcarrier frequency of the carrier color signal, and a frequency M/N times as high as a frequency $f_H$ of the horizontal synchronizing signal, each of M, N, K and L being an integer;

first divider means for frequency-dividing an output of said first oscillator means by K/L; and circuit means for generating from an output of said first divider means a carrier signal having a phase that is shifted in synchronism with the horizontal synchronizing signal; and a luminance signal processing circuit having a limiter circuit for limiting the amplitude of its output signal, said limiter circuit including a nonlinear signal compression circuit which comprises:

first and second transistors having bases to which first and second input terminals are connected through resistors, respectively, said first and second transistors forming a differential amplifier;

first and second load resistors connected to the collectors of said first and second transistors, respectively;

first and second output terminals derived from a junction point of said first load resistor and the collector of said first transistor and a junction point of said second load resistor and the collector of said second transistor, respectively; and first and second negative feedback circuits which are equivalent to each other and are respectively provided between the base of said first transistor and said second output terminal and between the base of said second transistor and said first output terminal, the circuit constant of each of said first and second negative feedback circuits being matched in accordance with an amplitude limitation level.

23. The apparatus as claimed in claim 22, wherein said first and second negative feedback circuits respectively include first and second differential amplifiers each including a pair of transistors having a conductivity type reverse to that of said first and second transistors, and said nonlinear signal compression circuit further comprises first and second voltage sources for generating respective voltage differences proportional to amplitude limitation levels of output signals from said first and second output terminals, said first and second voltage sources being respectively connected between said first load resistor and the base of one of the first differential amplifier pair of the transistors which is not applied to feedback connection, and between said second load resistor and the base of one of the second differential amplifier pair of transistors which is not applied to feedback connection.

24. A video signal recording/reproducing apparatus in which a carrier color signal having a subcarrier frequency $f_{SC}$ is recorded or reproduced after frequency conversion thereof to a lower-band signal, the phase of the lower-band signal being shifted in synchronism with a horizontal synchronizing signal, further comprising:

a carrier signal generating circuit including:
first oscillator means for providing a signal oscillating a frequency which is K/L times as high as the sum $f_c = f_{sc} + M/N\, f_H$, where $f_{sc}$ is a subcarrier frequency of the carrier color signal, and a frequency M/N times as high as a frequency $f_H$ of the horizontal synchronizing signal, each of M, N, K and L being an integer;

first divider means for frequency-dividing an output of said first oscillator means by K/L; and circuit means for generating from an output of said first divider means a carrier signal having a phase that is shifted in synchronism with the horizontal synchronizing signal; and a non-linear signal compression circuit including a first pair of differentially operative transistors respectively having bases to which first and second input terminals are connected through resistors; first and second load resistors connected to the collectors of said first pair of differentially operative transistors, respectively; first and second output terminals connected to said first and second load resistors, respectively; a second pair of differentially operative transistors, the base of one of which is connected directly to said second output terminal and the base of the other of which is connected to said first output terminal through a first voltage circuit for generating a voltage difference proportional to an amplitude limit level of an output signal obtained from said first output terminal; and a third pair of differentially operative transistors, the base of one of which is connected directly to said first output terminal and the base of the other of which is connected to said second output terminal through a second voltage circuit for generating a voltage difference proportional to an amplitude limitation level of an output signal obtained from said second output terminal; wherein the collector of the transistor in said second pair having its base connected directly to said second output terminal is connected to the base of one of the transistors in said first pair connected to said first input terminal, and the collector of the transistor in said third pair having its base connected directly to said first output terminal is connected to the base of the other of the transistors in said first pair connected to said second input terminal.

25. A video signal recording/reproducing apparatus in which a carrier color signal having a subcarrier frequency $f_{SC}$ is recorded or reproduced after frequency conversion thereof to a lower-band signal, the phase of the lower-band signal being shifted in synchronism with a horizontal synchronizing signal, further comprising:

a carrier signal generating circuit including:
first oscillator means for providing a signal oscillating a frequency which is K/L times as high as the sum $f_c = f_{sc} + M/N\, f_H$, where $f_{sc}$ is a subcarrier frequency of the carrier color signal, and a frequency M/N times as high as a frequency $f_H$ of the horizontal synchronizing signal, each of M, N, K and L being an integer;
first divider means for frequency-dividing an output of said first oscillator means by K/L; and
circuit means for generating from an output of said first divider means a carrier signal having a phase that is shifted in synchronism with the horizontal synchronizing signal; and a CR constant control circuit, including:
an oscillator circuit for generating a reference frequency signal;

a first CR constant circuit for receiving said reference frequency signal and for producing a first signal having a phase which is different from that of said reference frequency signal by 45° and a level which is $2^{-\frac{1}{2}}$ times that of said reference frequency signal, said first CR constant circuit including a resistor and a variable capacitance element;

a phase synthesis circuit for receiving said reference frequency signal and said first signal and for producing a second signal corresponding to a voltage generated at said resistor and said variable capacitance element;

a phase detection circuit for receiving said reference frequency signal and said second signal, and for producing a signal representative of a phase difference therebetween;

a control voltage generating circuit for producing a control voltage corresponding to said phase difference; and a negative feedback loop for applying said control voltage to said variable capacitance element as a control voltage therefor.

26. The apparatus according to claim 25, wherein said resistor and said variable capacitance element are formed in a semiconductor integrated circuit, said CR constant control circuit further comprising a second CR constant circuit for receiving an input signal different from said reference frequency signal, said second CR constant circuit including a resistor and a variable capacitance element laid out in said semiconductor integrated circuit in proximity to the resistor and the variable capacitance element of said first CR constant circuit, wherein said control voltage is applied to the variable capacitance element of said second CR constant circuit.

27. A carrier signal generating circuit in a video signal recording apparatus in which a carrier color signal having a subcarrier frequency ($f_{sc}$) is recorded after frequency conversion thereof to a low-band signal, the phase of the low-band signal being shifted in synchronism with a horizontal synchronizing signal, wherein the carrier color signal and the horizontal synchronizing signal are included in a video signal to be recorded, said carrier signal generating circuit comprising:

a voltage-controlled oscillator responsive to an input control voltage for providing an output signal oscillating at a frequency which is K/L times as high as the sum $f_c = f_{sc} + M/N*f_H$ where $f_{sc}$ is a subcarrier frequency of the carrier color signal, and at a frequency M/N times as high as a frequency $f_H$ of the horizontal synchronizing signal, each of M, N, K and L being an integer;

first divider means for frequency-dividing the output signal of the voltage-controlled oscillator by K/L;

subtracting means coupled to receive an output signal of the first divider means and the subcarrier frequency for subtracting the subcarrier frequency from a frequency $f_c$ of the output signal of the first divider means and for outputting a signal corresponding to the horizontal synchronizing signal;

phase comparator means coupled to receive the signal of the subtracting means and the horizontal synchronizing signal as a reference for producing the input control voltage representing a phase difference therebetween to the voltage-controlled oscillator; and circuit means for generating from an output of the first divider means a carrier signal having a phase that is shifted in synchronism with the horizontal synchronizing signal.

28. A carrier signal generating circuit according to claim 27, wherein the subtracting means includes:

second divider means for receiving an output representing the result of the subtraction and for frequency-dividing the subtraction results by M/N to output the signal corresponding to the horizontal synchronizing signal.

29. A carrier signal generating circuit according to claim 27, wherein said subtracting means includes delayed flip-flop circuit means coupled to receive the output of said first divider means as a clock input and the subcarrier frequency signal as another input for subtracting the subcarrier frequency from a frequency $f_c$ of the output signal of the first divider means to obtain the outputting signal corresponding to the horizontal synchronizing signal.

* * * * *